Jan. 14, 1941.  E. W. MILLER  2,228,967
METHOD OF COMPLETING GEAR FINISHING TOOLS
Filed Oct. 29, 1938  3 Sheets-Sheet 1

Inventor
Edward W. Miller

Patented Jan. 14, 1941

2,228,967

UNITED STATES PATENT OFFICE 2,228,967

METHOD OF COMPLETING GEAR FINISHING TOOLS

Edward W. Miller, Springfield, Vt., assignor to The Fellows Gear Shaper Company, Springfield, Vt., a corporation of Vermont Application October 29, 1938, Serial No. 237,780

5 Claims. (Cl. 76—101)

This invention relates to gear finishing tools of the type having gear teeth suitably arranged to mesh with the teeth of the gear to be finished when the axes of such tool and gear are crossed without intersection, or askew to one another, and in which the teeth of the tool are so varied in thickness lengthwise as to make extended bearing lengthwise on the teeth of the work gear while in such crossed relationship. In my prior copending applications Serial No. 594,422, filed February 23, 1932; Serial No. 50,573, filed November 19, 1935; and Serial No. 74,614, filed April 16, 1936, I have disclosed tools of this type characterized by opposite longitudinal curvatures in the opposite faces of the teeth, which curvatures are concave in externally toothed tools designed for finishing external gears and convex in all tools designed for finishing internal gears and also in tools with internal teeth for finishing external gears.

I have coined the term "enveloping tool" for convenient description of tools so characterized. This term is definitely descriptive of tools with longitudinal concave curvatures in their sides, because such curvatures enable the work gear teeth, in a manner of speaking, to be partially embraced or enveloped by the tool teeth. By extension I have applied the same term to the analogous situation existing between an internally toothed tool and an external gear, or vice versa, where the same condition of extended line contact exists although the teeth of the tool are convex lengthwise in their opposite sides. I will use the term thus defined in the following specification to designate all forms of the tool above described.

Owing to the bowed or curved formation of the tool teeth an extended bearing lengthwise with the work gear teeth is made possible, either throughout the entire length in common, or overlapping length, of such teeth, or throughout so much of the length in common as may be desired. Lacking any such bowed formation, the teeth of an external-internal gear and tool couple will engage only at the ends, while in couples of which both members have external teeth, the engagement is theoretically point contact only, and practically is an extremely small area, between the ends of the teeth. Tools having the enveloping characteristic herein defined, and made of suitable metal, are adapted to finish gears by lapping or burnishing or, when the teeth are interrupted by grooves or gashes of which the intersections with the side faces of the teeth form cutting edges, to finish gears by shaving or conjoint actions of scraping and burnishing.

The object of the present invention is to give to such enveloping tools the longitudinal curvature and consequent varying thickness from end to end required for finishing gears of which the tooth thickness is uniform from end to end, whether such gear teeth are straight or helical. The invention consists in a method of operating on tool blanks, already partially completed to the extent that they have been provided with teeth of uniform thickness and nearly finished dimensions, by cutters or grinders having teeth of the same pressure angle, pitch and helix angle as the gears for the finishing of which the enveloping tools are to be used, on a crossed axis arrangement like that between the enveloping tool and its work piece. By the term "crossed axis arrangement," and terms of similar import used in this specification, is meant that the axes of the enveloping tool blank and the cutter or grinder are neither parallel nor intersecting, but each makes a positive angle with a line parallel to the other. This definition applies also to the arrangement between the enveloping tool and the gears finished by its use.

In my prior application Serial No. 594,422, I have disclosed one phase of the present invention, that of forming the teeth of an internal enveloping cutter with convex longitudinal curvature on both sides by running it in mesh on a crossed axis arrangement with a metallic cutter having conjugate teeth of uniform thickness intersected by grooves forming cutting edges at intermediate points in their length. To the extent of their common subject matter, the present application is a continuation of said prior application. That phase of the invention is performed on enveloping tool blanks prior to hardening. Another phase of the present invention consists in completing the enveloping tool after hardening by similarly running it in mesh on a crossed axis arrangement with a grinding wheel having teeth like those of the cutter last referred to and also like those of the gears to be finished by the enveloping tool.

The enveloping tools which may be produced by this invention and are contemplated in the present application include combined cutting and burnishing tools integral throughout their length and having intermediate cutting edges formed by grooves or gashes, as disclosed in my aforesaid applications Serial Nos. 594,422 and 50,573; similar tools composed of two or more separable units with cutting edges on the ends of each unit, as disclosed in said application Serial No. 74,614;

and also burnishing tools and lapping tools without cutting edges.

In the drawings herewith—

Like reference characters designate the same parts wherever they occur in all the figures.

Figure 1:
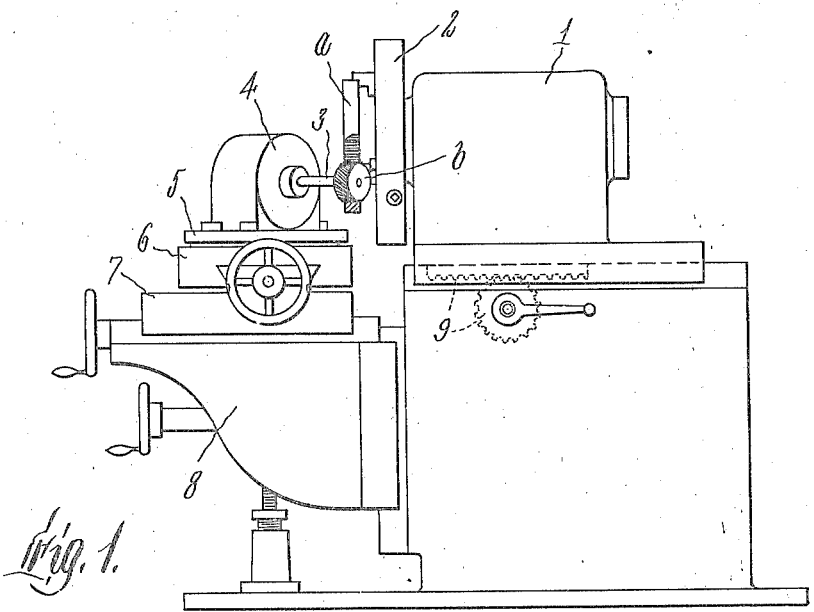
Fig. 1 is a side elevation illustrating in simplified form the principles of a machine adapted to be used for carrying out the method of this invention.
Figure 2:
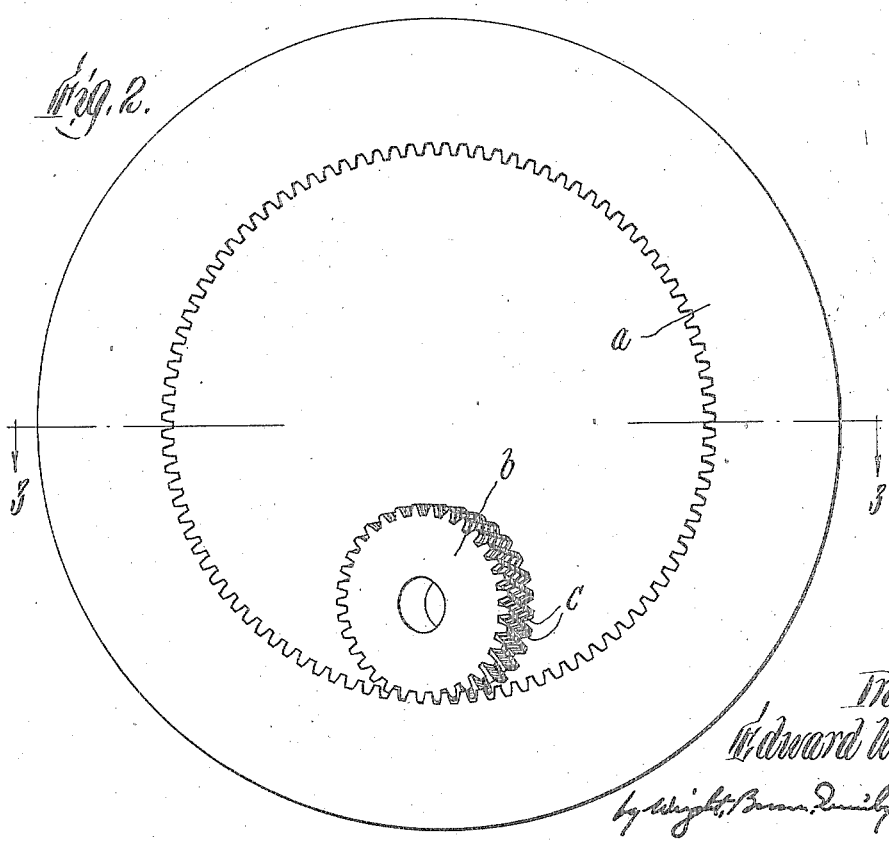
Fig. 2 is a view of the enveloping tool being generated and a cutting tool for generating it as seen from the left of Fig. 1 and represented on a larger scale.
Figure 3:
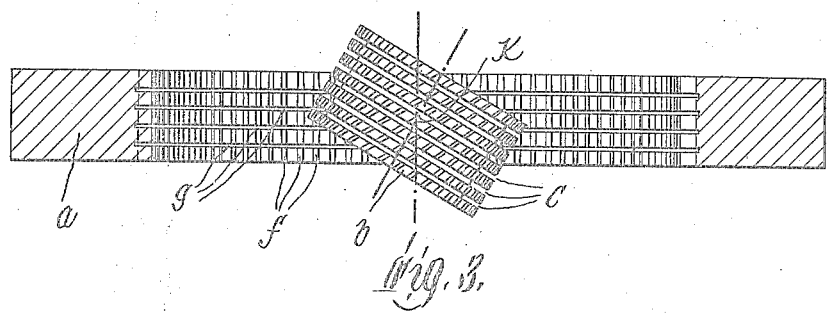
Fig. 3 is a horizontal section and plan view of the enveloping tool and cutter taken on line 3—3 of Fig. 2.
Figure 5:
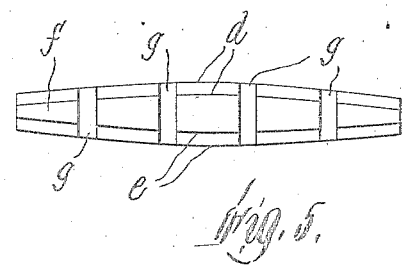
Fig. 5 is a plan view and Fig. 6 an end view of a tooth of externally bowed formation such as is produced by this method in internal finishing tools such as that shown in Fig. 3, and in external tools such as that shown in Fig. 4.
Figure 6:
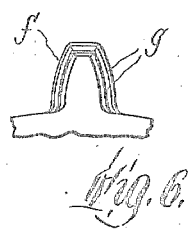

Figs. 1, 2 and 3 illustrate the case of producing an internally toothed finishing tool with straight teeth crowned or bowed suitably for finishing external helical gears with the extended contact described in the introductory part of this specification. The tool blank $a$, made of suitable metal to serve as a cutting or burnishing or lapping tool, as the case may be, is first cut as an internal gear with straight teeth. This may be done by the molding generating process, or otherwise, as desired. Its initial formation in this manner is not a factor of the present invention. The invention consists in giving oppositely bowed or crowned characteristics to the previously cut teeth such as will effect extended tooth contact with an external helical gear when the latter is meshed with the tool and placed with its axis at an inclination to the tool corresponding to the helix angle of its teeth. To give such formation to the tool teeth, the tool blank is meshed with a cutter $b$ having helical teeth of uniform thickness from end to end which are intersected by grooves or gashes $c$, of which the intersections with the side faces of the teeth form cutting edges. The cutter is rotated, driving the tool blank, and in the course of its rotation the cutting edges remove metal from the tooth faces of the tool blank. The cutter is fed radially outward from the axis of the tool blank, or the tool blank may be correspondingly fed relatively to the cutter, as the cutting action proceeds, with no shift or displacement of either the cutter or tool blank along or parallel to the axis of the blank. At first engagement takes place between the cutter and tool blank only at the ends of the teeth of the latter, but with continued rotation and radial feeding, the sides of the tool teeth are eventually cut away until they acquire convex longitudinal curvature at both sides, in the nature of the curves $d$ and $e$ of the tooth $f$ represented in Figs. 5 and 6. The degree of curvature is shown exaggerated in these latter figures, but the nature of the curvature is as there shown.

The tool blank and cutter may be mounted and operated in any suitable manner. By way of illustration I have shown in Fig. 1 a machine having a sliding carriage 1 in which is a rotatable spindle carrying a chuck 2 for holding the tool blank. The cutter is secured to the spindle 3 of a motor 4 mounted on an angularly adjustable turntable 5. The turntable is mounted on a cross slide 6 which in turn is supported by a longitudinal slide 7, and the latter is supported by a vertically adjustable bracket 8. The carriage 1 may be adjusted lengthwise of the tool blank axis by suitable means such as rack and pinion gearing 9. By these or other suitable means, a cutter of any helix angle may be brought into mesh with a tool blank of any diameter, within limits, with the axes of the tool blank and cutter crossed at an angle corresponding to the helix angle of the cutter teeth, and retained in the same meshing relationship while a depth feed is being performed, and the cutter may be fed to any depth necessary for giving a continuous curvature to the teeth of the finishing tool.

If the finishing tool $a$ is to be used for shaving or scraping, its teeth $f$ are grooved or gashed, as shown at $g$ in Fig. 3. Such grooves may be cut either before or after the teeth have been crowned as described. Finally the tool is hardened and thereby made ready for use as a tool for shaving external helical gears. If the tool is to be used as a lap or burnisher, the grooves $g$ are omitted from its teeth.

Tools essentially like the tool $a$ but differing in that their teeth are helical, are initially cut like internal helical gears, and are finished by the same method as herein described with the use of either a cutter having straight teeth or one having helical teeth of different helix angle from that of the tool being made.

Figure 4:
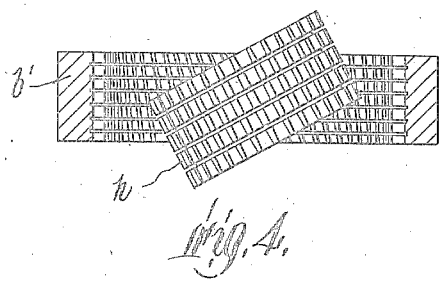
Fig. 4 is a view similar to Fig. 3 showing the application of the method for giving bowed curvature to the teeth of an external finishing tool having straight teeth and adapted to finish internal gears.

External tools for finishing internal gears are likewise made by the same process. Such a tool is shown at $h$ in Fig. 4. It is initially cut with teeth of uniform thickness, and its teeth are finished with longitudinal convex curvature by running it in mesh with an internally toothed cutter $b'$ in a crossed axis arrangement. Such cutter may be substituted for the tool blank $a$ in the machine of Fig. 1 and the blank for the tool $h$ mounted on the spindle 3 in substitution for the tool $b$. Cutter $b'$ is like cutter $b$ in that its teeth are provided with lateral cutting edges intermediate their ends. Running of the cutter and tool blank together with radial depth feed gives a crowned convex formation to the teeth of the tool $h$ of the same character as previously described. In this case also, as well as that first described, enveloping tools with straight teeth are finished by cutters having helical teeth, and those with helical teeth are finished by cutters having either straight teeth or helical teeth of different helix angle.

It may be noted that wherever in this specification the teeth of the enveloping tools are referred to as being straight, they are so designated in distinction from helical teeth. The term "straight" here means that their median radial planes are straight from end to end, and does not refer to the longitudinal elements of their side faces. Similarly the term "helical," as applied to enveloping finishing tools, refers to the median planes of the teeth. The longitudinal convexity or concavity of the opposite sides of such helical teeth in enveloping tools is measured with respect to the median helicoids of the teeth.

Figure 7:
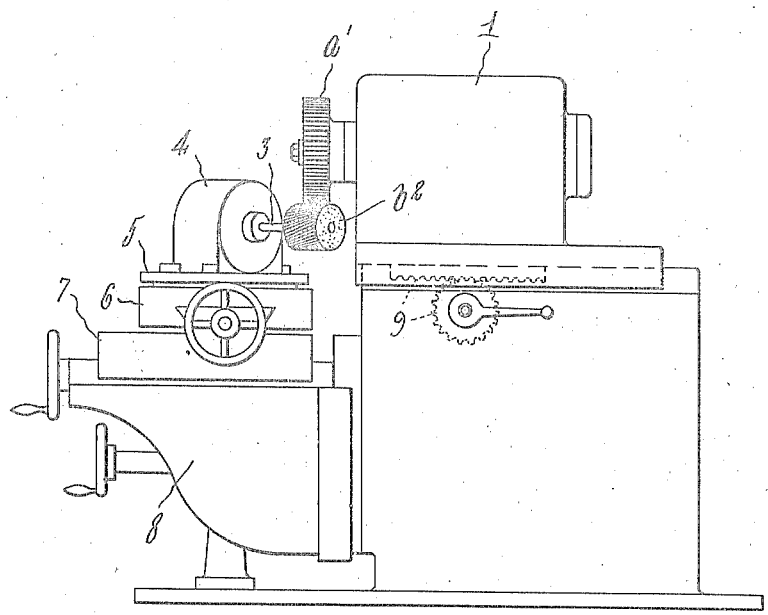
Fig. 7 is a view similar to Fig. 1, showing the application of the method for generating finishing tools with concave curvature in the sides of their teeth.
Figure 8:
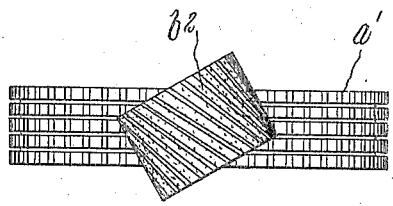
Fig. 8 is an under plan view of the cutter and finishing tool shown in Fig. 7.
Figure 11:
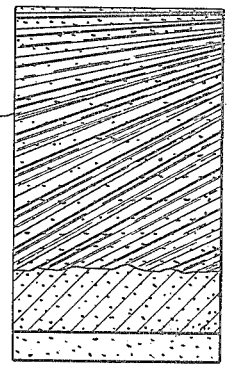
Fig. 11 is a side view and partial section of a grinding wheel adapted to finish external finishing tools of straight spur or helical tooth characteristics.
Figure 12:
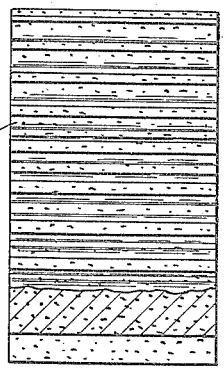
Fig. 12 is a similar view of a spur type grinder adapted to finish external helical enveloping tools.

The cutters thus far referred to are metallic edged cutters. I may, however, use grinding wheels of gear form as the cutters, and such grinding wheels are considered as equivalent to edged cutters and as embraced within the generic meaning of the term "cutter" as used in this specification and in the following claims, except where the context clearly indicates that a metallic cutter is meant. Figs. 11 and 12 show respectively a helical cutter $b^2$ and a spur cutter $b^3$ of grinding wheel characteristics, and Fig. 7 illustrates the application of the grinding cutter $b^2$ in the location of the metallic cutter $b$ shown in Fig. 1.

In finishing external enveloping tools, the same method is used, and may be carried out by the same apparatus as employed for finishing internal enveloping tools. The only difference is that the relative depth feed between the cutter and tool blank is effected toward, instead of away from the axis of the latter. Fig. 7 illustrates a case in which a tool blank $a'$ of spur gear character is finished by a helical cutter with external teeth.

Figure 9:
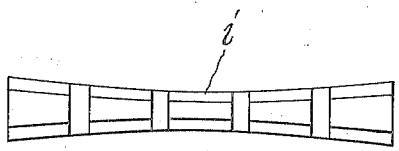
Figs. 9 and 10 are respectively a plan view and end view, on an enlarged scale and with exaggeration of the curvature, of teeth such as are produced in the finishing tool represented in Figs. 7 and 8.
Figure 10:
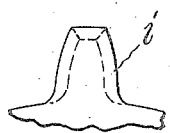

Initial contact between the cutter and tool blank takes place at a point between the ends of the tool blank teeth. As the cutting and depth feeding actions proceed, the parts of the tool blank teeth first engaged are cut away at opposite sides with a progressive lengthening of the line of simultaneous bearing on the cutter teeth. This results in forming concave longitudinal curves in the opposite sides of the enveloping tool teeth as shown in enlarged degree with respect to the tooth $i$ in Figs. 9 and 10, which may be considered as one of the teeth of the tool $a'$ when finished. Curvature of this character is produced in all longitudinal surface elements of the finished tooth (i. e., in the intersections of the tooth faces with cylindrical surfaces coaxial with the tool), while the tooth curves in planes perpendicular to the axis are conjugate to the teeth of the cutter. Likewise with respect to the convexly crowned teeth described with respect to Figs. 1–6, the face curves in planes perpendicular to the axis are conjugate to the cutter teeth.

Figure 13:
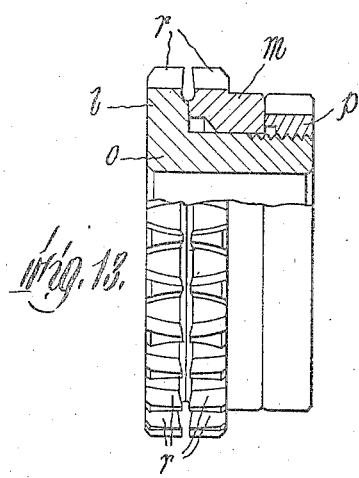
Figs. 13 and 14 are views of two-part enveloping tools having external teeth of straight spur and helical characteristics respectively, adapted for finishing external gears, the lateral curvature of the teeth of such tool being shown with exaggeration.
Figure 14:
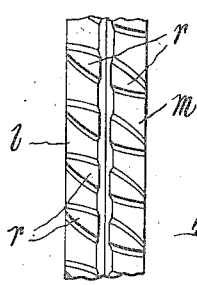

The two part enveloping tools shown in my application Serial No. 74,614 are finished in the same way. Figs. 13 and 14 herein show two representative specimens of the two part tools described in said application. These tools comprise a unit $l$ and a unit $m$ mounted on a holder $o$ (which may be a sleeve integral with the unit $l$), and clamped together by a nut $p$. Each unit has teeth $r$ on its circumference in spaced alinement with one another and having cutting edges on their relatively adjacent ends. Such teeth may be straight or helical, and concave for finishing external gears or convex for finishing internal gears. In the case of those with helical teeth, the alinement of teeth in the two units above referred to is along the median helicoids of the teeth. In finishing the teeth of such two part tools, the units are assembled in alinement as described, and the assembled tool is run in mesh with the same cutter, whereby the sides of the alined teeth are finished with curvatures which constitute segments of the same continuous curve.

External tools for external work are, like the other tools described, finish-generated by helical cutters when of spur tooth character, and by spur tooth cutters or helical cutters of different helix angle when their teeth are helical.

Any tools coming within the description of enveloping tools as here defined may be refinished or sharpened after wear has dulled the cutting edges or impaired the accuracy of the faces, by a repetition of the same process, with the use of a grinding cutter in cases where the tool is too hard to be affected by a metallic cutter.

In the generating method constituting this invention, the cutting edges of the metallic cutters and the abrading faces of the grinding cutters travel in paths inclined to those in which the teeth of the tool blank travel while in contact one with the other. Consequently the teeth of the cutter not only roll into and out of mesh with the teeth of the tool blank, but they also slip endwise and, by virtue of such relative endwise movement, scrape or abrade the tool blank teeth on the pitch lines thereof as well as outside and inside of such pitch lines.

Preferably the tool blank to be finished and the cutter, after having been once adjusted into meshing relationship, are maintained without change of relationship, except for the carrying out of the depth feed, throughout the performance of the method. The cutter selected in any case is preferably so much longer than the tool blank, and so symmetrically located relatively thereto, that its teeth will extend throughout at least the full length of the tool blank teeth when midway of the arc of action. Although some deficiency in the length of the cutter may be compensated for by reciprocating it along its own axis during the cutting action (thereby obtaining the effect of a longer cutter), it is preferable in the interest of accuracy and uniformity of cutting effect to avoid any such axial movement and depend wholly on the endwise slip to perform the cutting. In particular, it is to be noted that no displacement or traverse or feed of either the cutter or tool blank may occur along or parallel to the axis of the blank. Such traverse would result in finishing the teeth of the tool blank with uniform thickness at all points in their length, that is, without oppositely bowed or crowned formation of its side faces lengthwise which is effected by the practice of the invention.

The relationship thus described may be defined more concisely with reference to the line perpendicular both to the axis of the cutter and the axis of the tool blank, i. e., the common perpendicular to these axes. Such common perpendicular is represented in Fig. 3 as a line perpendicular to the plane of the drawing passing through the point $k$, where the projections of the cutter and tool blank axes in the plane of the drawing intersect. It is an essential of the invention that the position of the tool blank with respect to such common perpendicular established at the beginning, remain unchanged until the end, of the cutting operation.

What I claim and desire to secure by Letters Patent is:

1. The method of generating the tooth faces of a gear-like gear-finishing tool to produce an extended lengthwise bearing with the teeth of a conjugate gear to be finished when the tool and gear are meshed together with their axes askew to one another and the tool teeth are suitably arranged to mesh with the gear teeth; which consists in placing the blank for such a finishing tool in mesh with a finishing cutter having teeth of the same pitch, pressure angle and helix angle as the gears which the tool is designed to finish, and the sides of which cutter teeth have cutting characteristics, running such tool blank and cutter together as a pair of gears, and effecting a relative radial feeding movement between the cutter and tool blank, while maintaining unchanged a given relationship between the tool blank and the common perpendicular to the axes of the cutter and blank, until an extended lengthwise bearing between the intermeshing teeth of the cutter and blank has been obtained.

2. The method of crowning the teeth of an internally toothed gear finishing tool to make lengthwise bearing with the teeth of a conjugate external gear when such tool and gear are meshed together with their axes askew and the tool teeth are suitably arranged to mesh with the gear teeth; which consists in running such tool in mesh with an externally toothed finishing cutter having teeth of the same pitch, pressure angle, and helix angle as the gear, and having cutting characteristics in the sides of such teeth, and effecting a depth feeding movement radially of the tool, while maintaining the tool in unchanged relation to the common perpendicular to the axes of tool and cutter, until the side faces of the teeth of such tool have become longitudinally convex.

3. The method of shaping internally toothed annular elements to effect even bearing lengthwise between the side faces of their teeth and the teeth of a conjugate external gear arranged on a skewed axis with respect to such annular element, which consists in providing a toothed cutter identical with such external gear as to the form, dimensions and location of its teeth, and having cutting edges in the sides of its teeth, placing such cutter and the internally toothed element to be shaped in mesh with each other, at the same skew angle as that proposed for the external gear, and running the cutter and internally toothed element together in the manner of a gear pair while maintaining the internal element in unchanged relationship with the common perpendicular to the axes of said element and the cutter, with progressive depth feed, until the teeth of the latter have been shaped to make substantially uniform bearing from end to end with the teeth of the cutter.

4. The method of producing longitudinally concave curvatures in the side faces of the teeth of an external gear element, which consists in providing a cutter in the form of an external gear having teeth conjugate to those of the gear element, which teeth are suitably arranged to mesh with the gear element when the axes of the element and cutter are askew to one another, placing such gear element and cutter in mesh with their axes askew at the angle conformable to their tooth arrangement, running said element and cutter in the manner of a pair of gears with one driving the other, and effecting a relative depth feed between them while maintaining the same relationship between the gear element and the common perpendicular to the axes of the element and cutter until a desired concavity in the sides of the teeth of the gear element has been obtained.

5. The method of crowning the teeth of an externally toothed gear element with opposite longitudinal convexity, which consists in providing an internally toothed cutter of which the teeth are conjugate to those of such gear element and are suitably arranged to mesh with the gear element when the axes of cutter and gear element are askew to each other, placing the gear element and cutter in mesh with their respective axes askew conformably to such tooth arrangement, running them together in the manner of a pair of gears with one driving the other, and effecting a relative depth feed between the cutter and gear element while maintaining the same relationship between the gear element and the common perpendicular to said axes until a predetermined degree of longitudinal convexity has been generated in the tooth faces of the gear element.

EDWARD W. MILLER.